United States Patent
Bellucci

(10) Patent No.: US 6,823,572 B2
(45) Date of Patent: Nov. 30, 2004

(54) SYSTEM FOR CARRYING OUT MECHANICAL WORKINGS

(75) Inventor: Marco Bellucci, Lugano (CH)

(73) Assignee: EMMEGI S.A., Luxembourg, Lugano Branch, Lugano (CH)

( * ) Notice: Subject to any disclaimer, the term of this patent is extended or adjusted under 35 U.S.C. 154(b) by 54 days.

(21) Appl. No.: 10/182,691

(22) PCT Filed: Feb. 1, 2001

(86) PCT No.: PCT/IB01/00130

§ 371 (c)(1),
(2), (4) Date: Jul. 30, 2002

(87) PCT Pub. No.: WO01/56738

PCT Pub. Date: Aug. 9, 2001

(65) Prior Publication Data

US 2004/0057807 A1 Mar. 25, 2004

(30) Foreign Application Priority Data

Feb. 1, 2000 (CH) .............................. 194/00

(51) Int. Cl.⁷ .............................. B23Q 7/02; B23C 1/14
(52) U.S. Cl. ........................ 29/38 A; 409/159; 409/161; 409/165; 409/173; 409/174; 409/198; 409/221; 82/122; 269/63; 269/57
(58) Field of Search ................................ 29/33 P, 563, 29/38 A; 82/129, 122; 409/165, 166, 168, 198, 159, 161, 172, 173, 174, 221; 451/385, 398, 402, 403; 269/57, 63

(56) References Cited

U.S. PATENT DOCUMENTS

| | | | | |
|---|---|---|---|---|
| 3,742,791 A | * | 7/1973 | Sato ............................ | 82/122 |
| 3,805,581 A | * | 4/1974 | Thibodeau .................. | 72/407 |
| 4,454,645 A | | 6/1984 | Schissler | |
| 5,074,741 A | * | 12/1991 | Johansson ................... | 269/57 |
| 5,697,270 A | * | 12/1997 | Link ........................... | 82/129 |
| 5,940,948 A | * | 8/1999 | Rehm ......................... | 409/163 |
| 5,957,638 A | | 9/1999 | Winkler | |
| 6,158,312 A | * | 12/2000 | Link et al. .................... | 82/122 |
| 6,185,802 B1 | * | 2/2001 | Gruber et al. .............. | 29/38 R |

FOREIGN PATENT DOCUMENTS

| | | | |
|---|---|---|---|
| CH | 461219 | | 8/1968 |
| DE | 2359381 | | 6/1975 |
| DE | 3216345 | | 11/1983 |
| DE | 004027895 A1 | * | 3/1992 |
| DE | 4113629 | | 10/1992 |
| DE | 19620449 | | 11/1997 |
| EP | 0442160 | | 8/1991 |
| EP | 0558982 | | 9/1993 |
| EP | 0744244 | | 11/1996 |
| EP | 0941803 | | 9/1999 |
| JP | 57-107759 A | * | 7/1982 |
| JP | 6-297222 A | * | 10/1994 |

OTHER PUBLICATIONS

Patent Abstracts of Japan vol. 1995 No. 03, Apr. 28, 1995 & JP 06 335838 A (Nippei Toyama Corp; Other: 01), Dec. 6, 1994.

* cited by examiner

Primary Examiner—Erica Cadugan
(74) Attorney, Agent, or Firm—Collard & Roe, P.C.

(57) ABSTRACT

A machine for carrying out mechanical workings preferably by showing removal includes a frame arranged for receiving a semi-worked piece having a cross section exhibiting dimensions remarkably smaller than the length of the piece measured along its own longitudinal axis. The semi-worked piece is arranged with the longitudinal axis along a working axis in a working station. A clamp is arranged at a number of cross sections of the semi-worked piece for locking the semi-worked piece in the working station. A tool is arranged for carrying out workings on faces of the semi-worked piece. A support to which the semi-worked piece is fixed by the clamp is suitable to be rotated about a service axis.

15 Claims, 8 Drawing Sheets

SYSTEM FOR CARRYING OUT MECHANICAL WORKINGS

CROSS REFERENCE TO RELATED APPLICATIONS

Applicants claim priority under 35 U.S.C. §119 of SWISS Application No. 194/00 filed on Feb. 1, 2000. Applicants also claim priority under 35 U.S.C. §365 of PCT/IB01/00130 filed on Feb. 1, 2001. The international application under PCT article 21(2)was published in English.

The invention relates to single-spindle machine, method and apparatus for carrying out mechanical workings, preferably by shaving removal on elongated mechanical parts, such as general semi-worked pieces.

Prior art comprises machine tools for working profiled elements, for example made of aluminium or PVC, wherein the profiled elements, consisting of bars often having even remarkable length, are arranged in a fixed working position with respect to a base-frame and are kept in that position through a plurality of fastening clamps. A moving trolley, carrying motorized groups of tools, is positioned at pre-established, longitudinally consecutive, cross sections of the profiled element in order to perform on each section the required mechanical workings.

A first limitation of these known machines consists in that, the downwards face of the profiled element to be worked, i.e. the one adjacent to the machine bed, is poorly accessible and then difficult to be worked, since the base-frame overall dimensions hamper tool approach to the profiled element.

Workings on the face adjacent to the machine bed are performed through operating heads with mechanical transmission of motion, which are placed faraway from the supports and are therefore not very accurate. However, these operating heads can only perform relatively simple operations.

Consequently, if the profiled element has to be subjected to complex workings also on the face adjacent to the machine bed, it is necessary to position it again on the machine after rotating it of a suitable angle about its own longitudinal axis, so that the face, which was previously difficult to be machined, is now easily accessible by a suitable tool, or group of tools.

A further limitation of such machines can be found in the heavy impact of loading and unloading idle times on the working cycle: actually, when the planned working sequence on a single profiled element is finished, it is necessary to pick it up in order to clear the working position on the machine and to carry in that position another element which has still to be worked; the already worked element clearing phase and the still to be worked element positioning phase, during which it is not possible to carry out any machining on the profiled element, imply a remarkable waste of time, particularly if—as it often happens—the elements to be worked are considerably voluminous.

In addition, clamps are known for locking the profiled elements to be worked on the bed of such machines, wherein locking of each clamp is provided by feeding compressed air to pneumatic actuating members that keep each clamp in a pre-established position while locking it on the guides.

These clamps have the disadvantage of requiring a complex air supplying circuit and furthermore, if the air pressure accidentally decreases, the clamps result substantially free to move along the guides, which implies risks of failures and accidents for personnel in charge.

Furthermore, the known machines require that the profiled element is at first placed in a working station, subsequently worked in that station and then unloaded. This implies the disadvantage that the profiled element machining has to be stopped during the positioning and unloading operations of the profiled element from the working station: that produces excessively long cycle times.

Therefore, the problem arises of improving the known systems for carrying out mechanical workings on profiled elements. More in particular, it is desirable that it is possible to carry out the required workings on every face of the profiled element.

Furthermore, it is desired to find a more efficient working system for profiled elements, i.e. wherein the impact of loading and unloading times is remarkably reduced.

In addition, it is desired to find a new clamps actuation structure which is more reliable and simple.

In a first aspect of the invention, a machine is provided for carrying out mechanical workings preferably by shaving removal, comprising frame means arranged for receiving a semi-worked piece to be worked, the semi-worked piece having a cross section exhibiting dimensions remarkably smaller than the length of the piece measured along its own longitudinal axis, said semi-worked piece being arranged with said longitudinal axis along a working axis in a working station, clamp means arranged at a plurality of cross sections of said semi-worked piece for locking said semi-worked piece in said working station, tool means arranged for carrying out workings on faces of said semi-worked piece, characterized in that, supporting means is provided to which said semi-worked piece is fixed by said clamp means, said supporting means being suitable to be rotated about a service axis.

In a version, the service axis is coincident with said working axis.

In this case, as supporting means is provided, it is possible to machine all the faces of the semi-worked piece, since, after carrying out mechanical workings on the semi-worked piece faces directly accessible by tool means, it is possible to rotate the, supporting means in order to work the remaining face or faces, without removing the semi-worked piece from the working station.

In a further version, the service axis can be positioned parallel to said working axis.

This allows the supporting means to be equipped with more than one semi-worked piece; it is therefore possible, for example, after completing workings on a semi-worked piece, to rotate the supporting means in order to bring the already worked semi-worked piece into an unloading station, and simultaneously bring a still to be worked semi-worked piece into the working station.

Advantageously, the supporting means comprises first supporting means arranged for rotating the semi-worked piece about said working axis and second supporting means arranged for rotating the first supporting means, together with the semi-worked piece associated thereto, about a service axis parallel to said working axis.

This allows all the faces of the semi-worked piece to be machined without removing it from the working station, the already worked semi-worked piece to be quickly unloaded from the working station and a still to be worked semi-worked piece to be loaded in said station.

Advantageously, the working axis and the service axis are arranged in vertical position.

It is thus possible to obtain a machine for working semi-worked pieces having very reduced plant overall dimensions. Furthermore, such a machine can be easily soundproofed.

If a vertical arrangement for such a machine is provided, the user can collect downwards the shavings produced when machining the semi-worked piece and can remove them in a very simple way.

Finally, in a vertically developed machine, the semi-worked piece to be worked can be positioned in the optimal manner, as, since it is a slender piece, it would show a tendency to bend under its own weight if it were arranged horizontally.

In a second aspect of the invention, clamp means is provided slidably coupled on guide means and arranged for locking a semi-worked piece, at cross sections taken along its length, through pliers means driven by suitable actuating means, characterized in that, said clamp means is provided with mechanical locking means suitable to lock said clamp means onto said guide means.

Since mechanical locking means is used for locking the clamps a greater positioning reliability can be obtained, which prevents a complex and bulky pneumatic circuit for compressed air supplying to be arranged.

In a third aspect of the present invention, a method is provided for working semi-worked elements, comprising placing a semi-worked piece in a working station, characterized in that, substantially simultaneously to said placing it is further provided placing a semi-worked piece to be worked in a loading station and extracting a semi-worked piece already worked from an unloading station.

In this way, the semi-worked piece working cycle is made particularly efficient since auxiliary working steps are performed while semi-worked piece working is in progress, instead of being performed before or after working is carried out as in traditional systems.

The invention will be better understood and carried out with reference to the attached drawings, which show an exemplifying and not restrictive embodiment thereof, in which.

Figure 1:
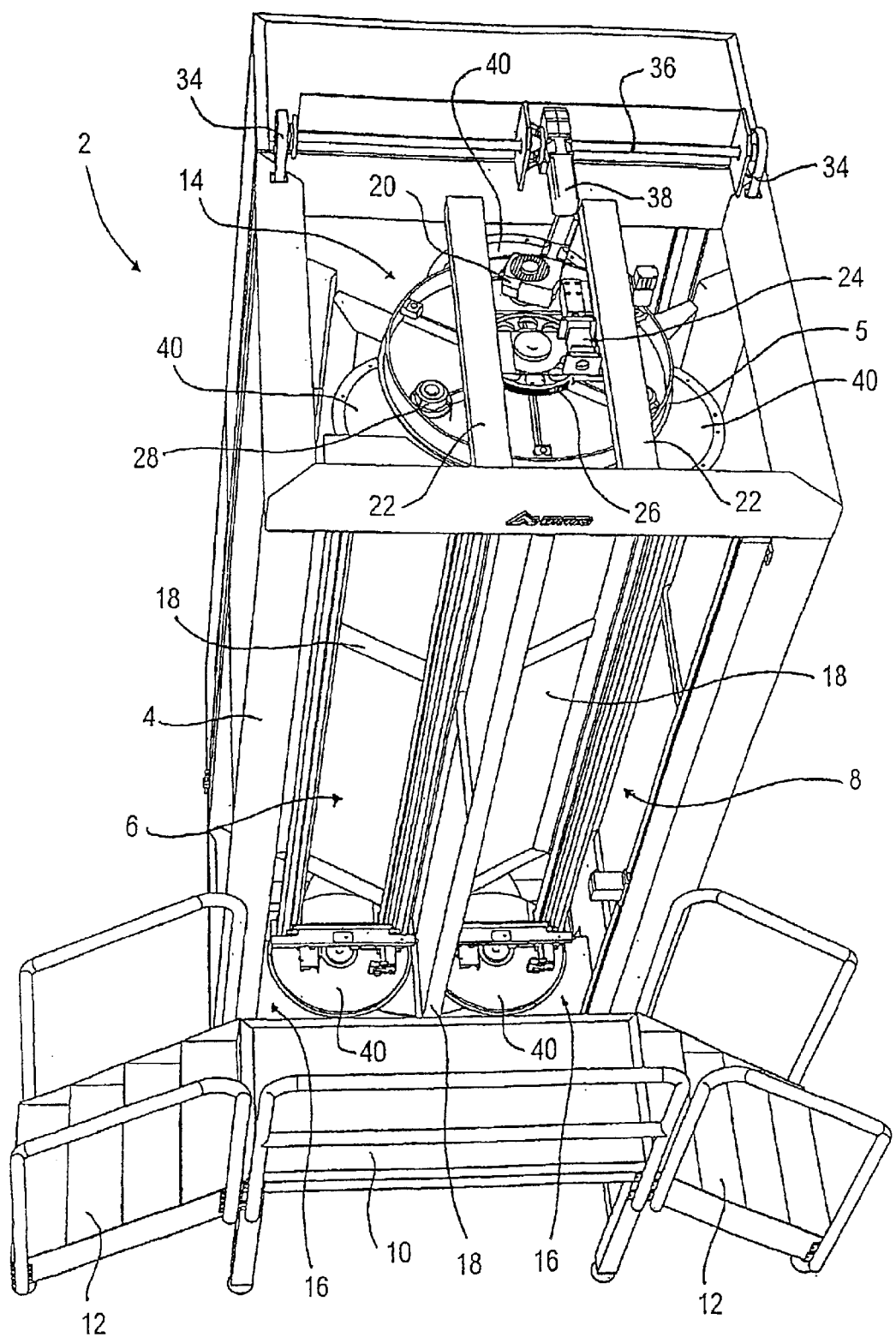
FIG. 1 is a perspective view of a machine for working semi-worked pieces.
Figure 2:
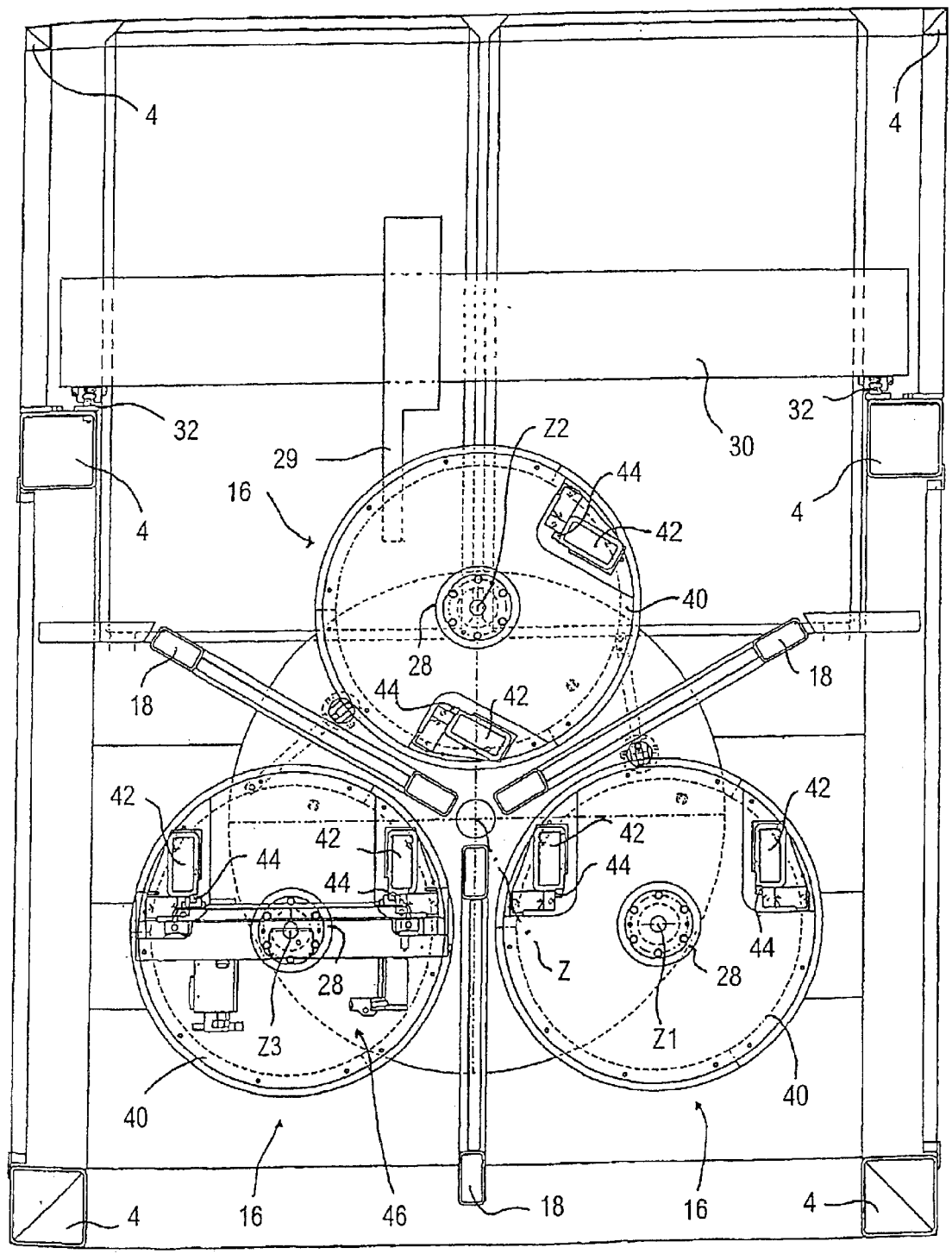
FIG. 2 is an intermediate section of the machine of FIG. 1, along a horizontal plane.
Figure 3:
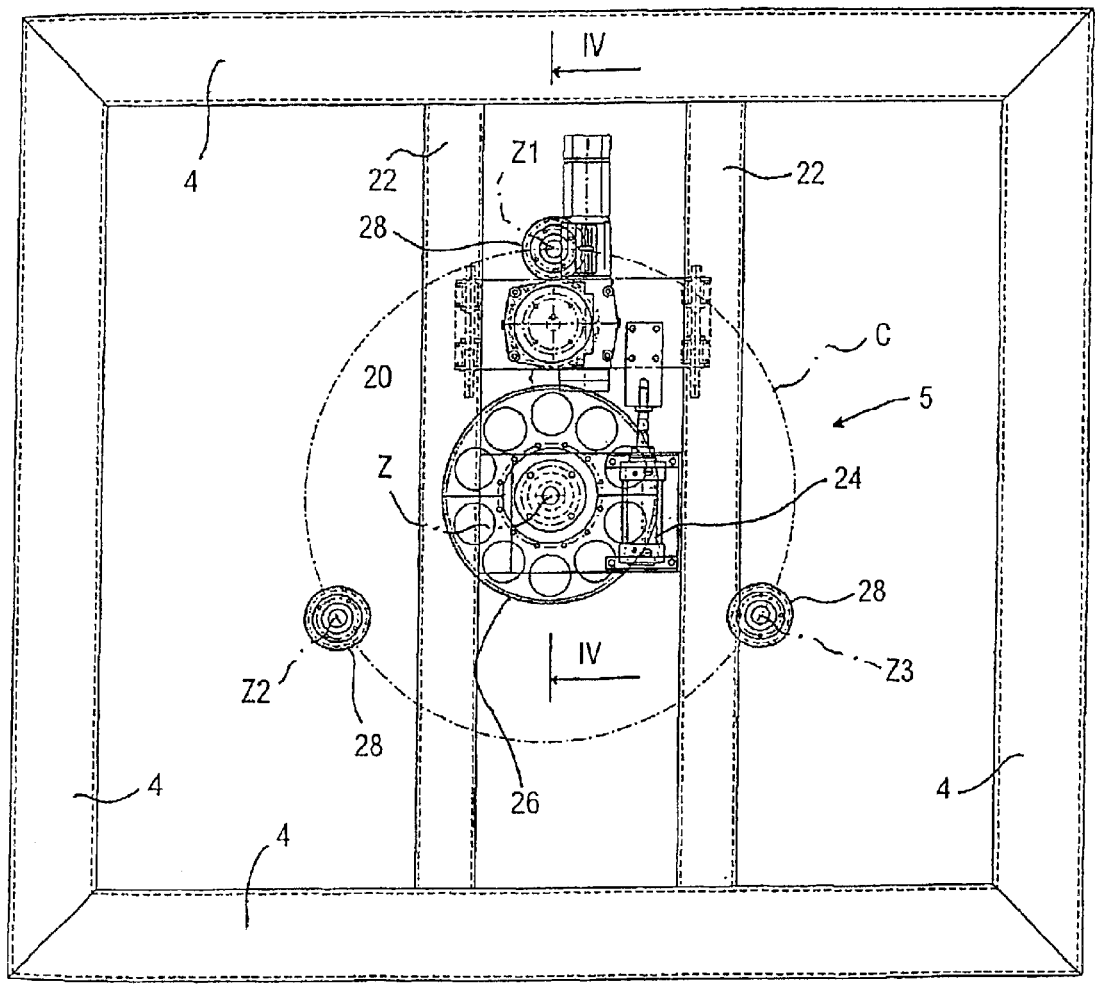
FIG. 3 is a top view of the machine of FIG. 1.

As shown in FIGS. 1, 2 and 3, a machine 2 comprises a frame 4 to which a carousel 5 is supported, which is indexed at angular steps of 120° about a vertical axis indicated by Z in FIG. 2. In the front portion of frame 4 are defined a loading station 6, wherein semi-worked, raw pieces P are introduced into the machine 2 (FIG. 7), an unloading station 8 wherein already worked semi-worked pieces are extracted from the machine 2 and a foot platform 10 accessible through small stairs 12 in order to allow an operator to approach the loading station 6 and the unloading station 8.

In the rear portion of the frame 4 a working station 14 is arranged, wherein the semi-worked piece undergoes the required workings.

Frame 4 completely surrounds the operating parts of the machine 2, so that the machine can be completely closed by sound absorption and soundproof panels preventing noise from escaping towards external environment and furthermore forming a protection barrier against accidental shavings escape, or entrance of people who could be injured.

Cradles 16 are supported to the carousel 5, so as to be rotatable about further vertical axes Z1, Z2, Z3, and spaced one from the other by a 120° angular step. Between each cradle 16 and the adjacent cradle 16 a separating panel 18 is arranged, fixed to the carousel 5. In this way, when a cradle 16, carrying a semi-worked piece to be worked, stands in the working station 14, the panels 18 adjacent to the cradle 16 make the working station 14 substantially inaccessible.

On the top of frame 4 a gear motor unit 20 is mounted, movable by a linear actuator 24 along guides fixed to cross-beams 22 of the frame 4, so as a driving gear wheel 20a of the gear motor unit 20 alternatively engages a crown gear 26, fixed to the carousel 5, or a pinion 28 fixed to each cradle 16 at the further vertical axis Z1, Z2 or Z3. The further vertical axes Z1, Z2, Z3 define a circle C during their revolution motion around the axis Z.

In a working configuration, the gear motor unit 20 engages the crown gear 26 when the carousel 5 has to be rotated by a 120° angle in order to bring an already worked semi-worked piece P to the unloading station 8 and a still to be worked semi-worked piece to the working station 14.

In another working configuration, the gear motor unit 20 engages the pinion 28 of the cradle 16 standing in the working station 14 and turns to a spindle 29 a working face of the semi-worked piece to be worked.

The spindle 29 is supported by a cross-beam 30 which is in engagement with vertical guides 32 fixed to the frame 4 and which may be vertically positioned through toothed belts 34 wound around respective pulleys that can be rotatably driven by a shaft 36 coupled to a gear motor 38.

Each cradle 16 is axially delimited by a couple of end flanges 40 interconnected to each other through a couple of uprights 42 on which guide means 44 are obtained. The guide means 44 are suitable to slidably receive clamp means 46 arranged in sufficient number to assure a proper locking of the semi-worked piece P during its working and transferring.

Figure 4:
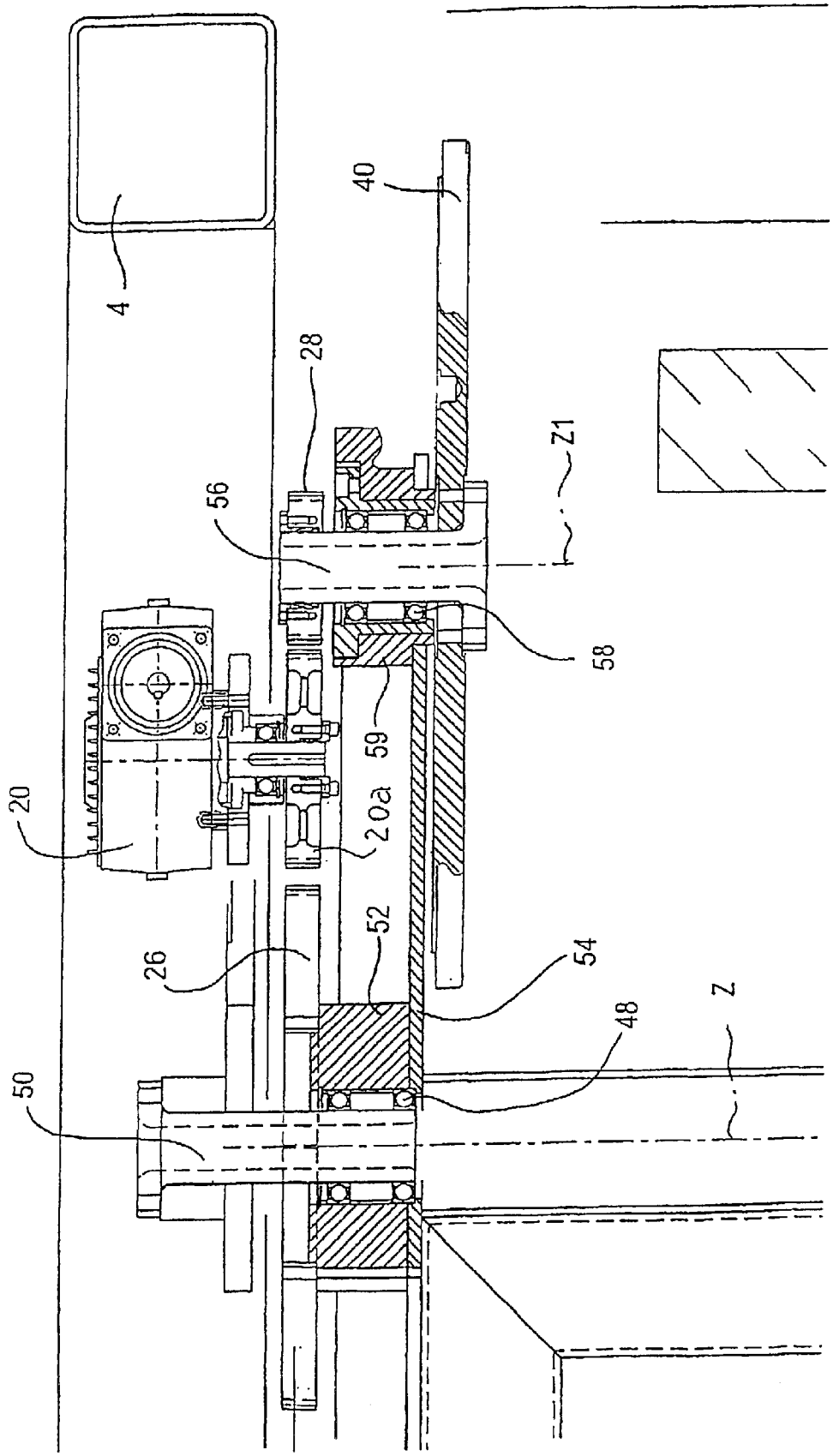
FIG. 4 is a vertical section, taken along the plane IV—IV of FIG. 3.

As FIG. 4 shows in detail, the upper portion of carousel 5 is rotationally coupled to a pin 50 fixed to the frame 4 through a bearing 48 interposed between the pin 50 and a hub 52, to which the crown gear 26 is connected. The hub 52 is fixed to an upper plate 54 delimiting the upper end of the carousel 5.

At the further vertical axis Z1, Z2 or Z3, each flange 40 is provided with an appendix 56 passing through the upper plate 54 and rotationally coupled to it through rolling means 58 interposed between the appendix 56 and sleeve means 59 fixed to the upper plate 54.

Figure 5:
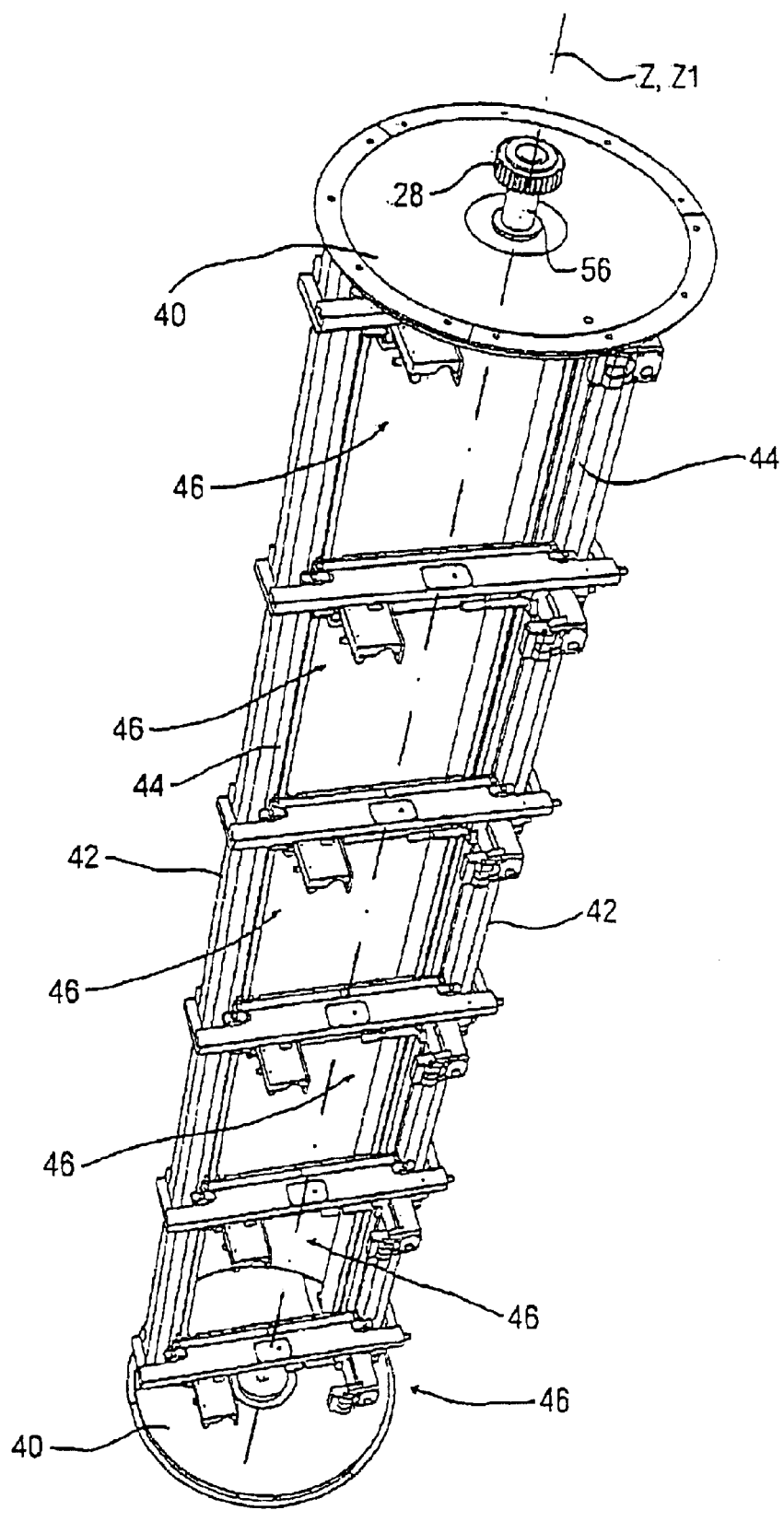
FIG. 5 is a perspective view of cradle means wherein semi-worked pieces to be worked are arranged.
Figure 6:
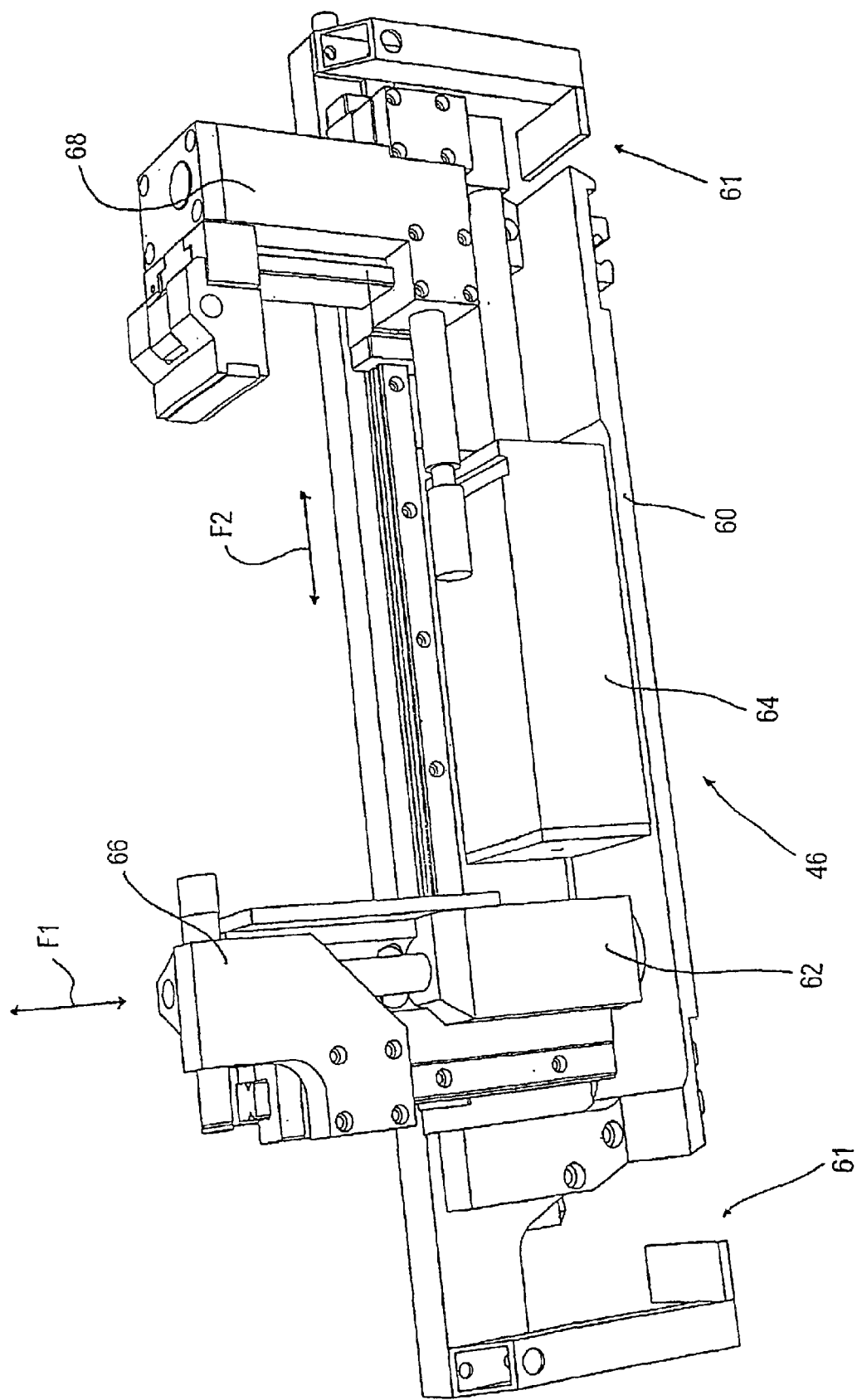
FIG. 6 is a perspective view of clamp means for fastening the semi-worked piece.
Figure 7:
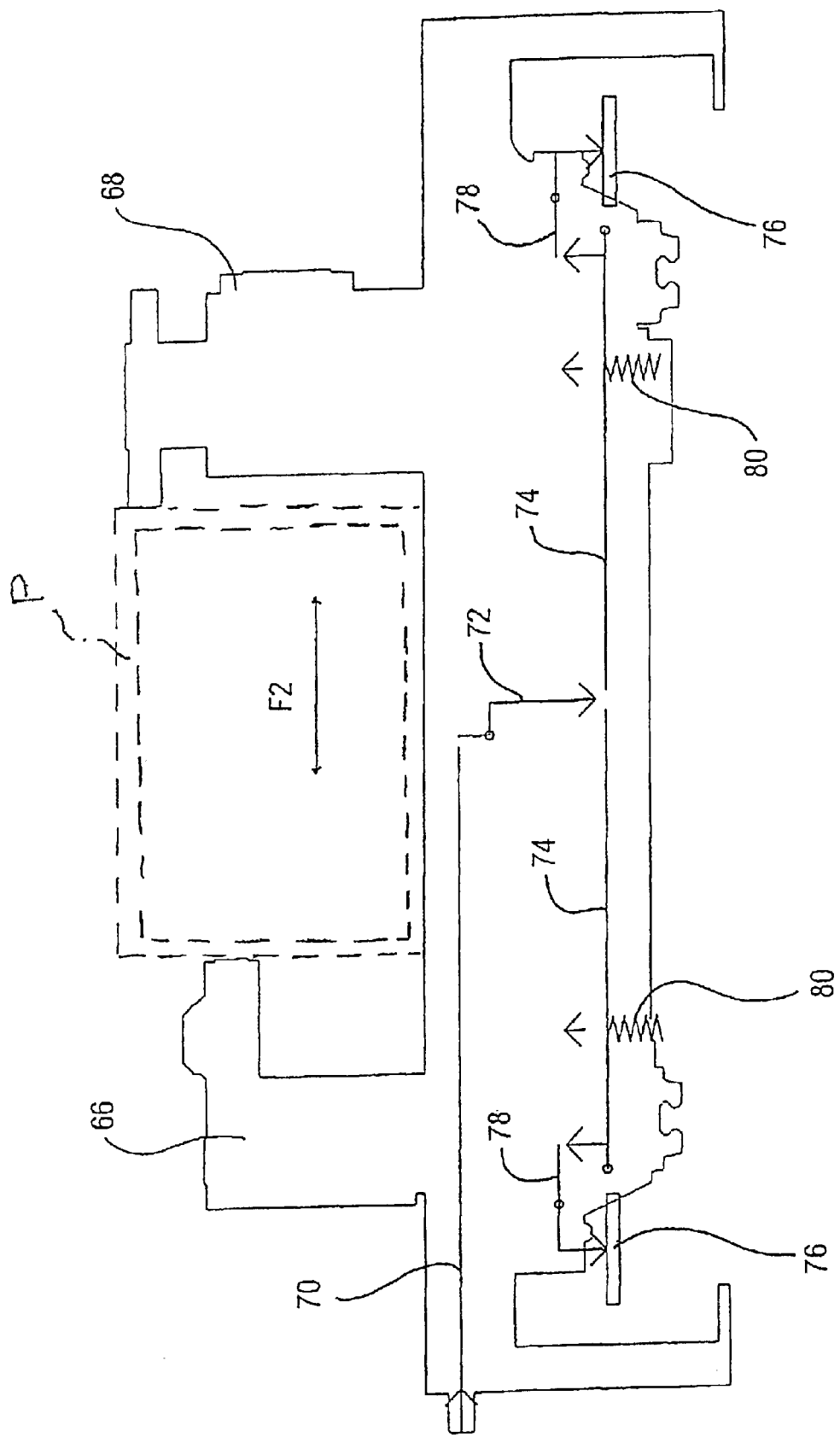
FIG. 7 is a sketched view of the clamp means, highlighting the positioning mechanism over the guides thereof.

As highlighted in FIGS. 5, 6 and 7, each clamp means 46 is equipped with a cross-beam body 60 provided with ends engaging the guide means 44 and terminating with a hook-like shape 61 in order to surround the uprights 42. First actuating means 62 and second actuating means 64 are fixed to the cross-beam body 60. The first actuating means 62 has the function to position first locking means 66, removing them from or moving them close to the cross-beam body 60 along a transversal direction F1 in order respectively to release or lock a profiled portion of the semi-worked piece P, arranged near said first locking means. The second actuating means 64 has the function to remove second locking means 68 from and move them close to the first locking means 66 along a longitudinal direction F2, in order respectively to lock a profiled portion of the semi-worked piece P to be worked against the first locking means 66, and release it therefrom, said profiled portion being arranged near said second locking means.

In the cross-beam body 60 a mechanism is inserted, arranged for releasing or fixing the clamp means 46 on the uprights 42. The mechanism comprises an actuating rod 70 axially slidable under the action of an external thrust acting at fine end thereof (exerted by suitable linear actuating means not shown) and actuating at the opposite end a rocker arm 72 centrally arranged in the cross-beam body 60 for driving a couple of actuating levers 74 acting on friction pads 76 through swinging levers 78 against the action of elastic means 80.

The friction pads 76 operate on brake lining surfaces of the uprights 42.

Figure 8:
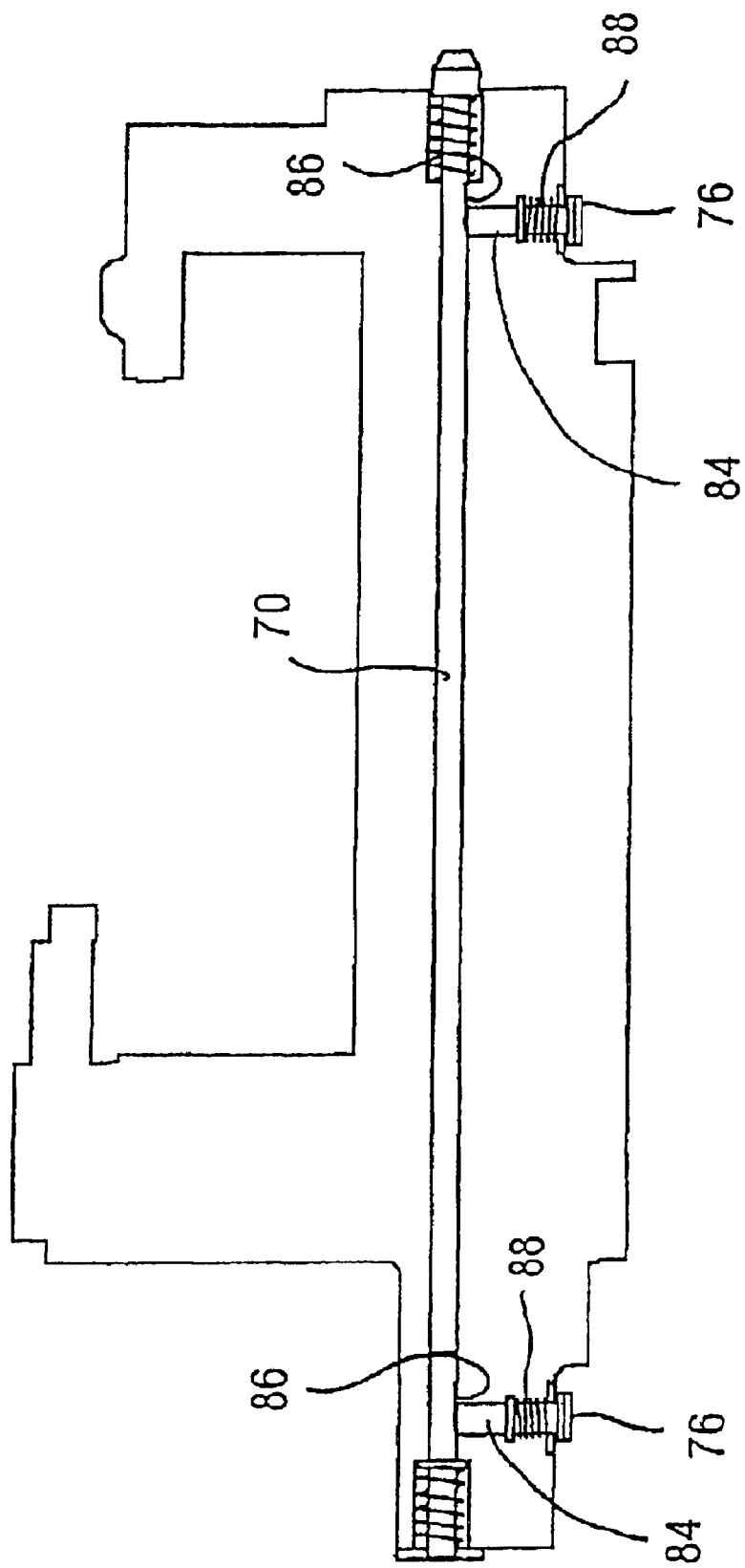
FIG. 8 is a sketched view of the clamp means highlighting the positioning mechanism over the guides in an operational variation.

In the version shown in FIG. 8, the actuating rod 70 directly operates on the ends of a couple of driven rods 84 bringing at the opposite ends the friction pads 76. The actuating rod 70 is provided with inclined planes 86 arranged in such a way that when the actuating rod 70 is pushed towards the inner part of the cross-beam 60, the driven rods 84 are free to enter the body of the cross-beam 70 under the action of elastic return means 88, releasing therefore the guide means 44 from the pads 76, in order to allow longitudinal positioning of the clamp along the guide means under the action of suitable linear actuating means not shown. When the force acting on the actuating rod 70 is stopped, the actuating rod 70 comes back in its initial position pressing again the driven rods 84 with the pads 76 against the guides 44.

What is claimed is:

1. A machine for carrying out mechanical workings comprising:
   (a) a frame arranged for receiving a semi-worked piece to be worked, the semi-worked piece having a length and a cross section smaller than the length measured along a longitudinal axis of the semi-worked piece;
   (b) a working station disposed within said frame, the semi-worked piece being arranged with the longitudinal axis along a working axis in said working station;
   (c) a clamp arranged at a plurality of cross sections of the semi-worked piece for locking the semi-worked piece in said working station;
   (d) a tool arranged for carrying out workings on faces of the semi-worked piece,
   (e) a first support and a second support, said second support being supported by said frame, the semi-worked piece is fixed to the first support by said clamp, said second support being rotatable about a service axis parallel to said working axis, said first support being supported on said second support so as to be rotatable about said working axis; and
   (f) a gear motor unit movably mounted on an upper portion of said frame so as to engage alternatively said first support at said working axis of said second support at said service axis.

2. The machine according to claim 1, wherein said working axis and said service axis are arranged vertically.

3. The machine according to claim 1, wherein said second support comprises a plurality of the first supports and wherein a wall is interposed between each said first support and an adjacent one of the first supports to define compartments arranged for individually containing each said first support.

4. The machine according to claim 1, wherein said tool is supported by a cross-beam which is in engagement with vertical guides fixed to said frame.

5. The machine according to claim 4, wherein said cross-beam is vertically positionable through toothed belts wound around respective pulleys rotatable by a shaft coupled to a gear motor.

6. The machine according to claim 1, wherein said gear motor unit is movable on said frame through an actuator.

7. The machine according to claim 1, further comprising a gear driven element fixed to a member selected from the group consisting of said first support and said second support, wherein said gear motor unit comprises a gear motor arranged for engaging said gear driven element.

8. The machine according to claim 7 wherein said gear driven element comprises a crown gear fixed to said second support and delimiting said upper portion.

9. The machine according to claim 7 wherein said gear driven element comprises a pinion fixed to said first support.

10. A machine for carrying out mechanical workings comprising:
    (a) a frame arranged for receiving a semi-worked piece to be worked, the semi-worked piece having a length and a cross section smaller than the length measured along a longitudinal axis of the semi-worked piece;
    (b) a working station disposed within said frame, the semi-worked piece being arranged with the longitudinal axis along a working axis in said working station;
    (c) a clamp arranged at a plurality of cross sections of the semi-worked piece for locking the semi-worked piece in said working station;
    (d) a tool arranged for carrying out workings on faces of the semi-worked piece; and
    (e) a support supported by said frame, to which support the semi-worked piece is fixed by said clamp, said support being rotatable about a service axis and having a hub and an upper portion rotationally coupled to a pin fixed to said frame through a bearing interposed between said pin and said hub.

11. A machine for carrying out mechanical workings comprising:
    (a) a frame arranged for receiving a semi-worked piece to be worked, the semi-worked piece having a length and a cross section smaller than the length measured along a longitudinal axis of the semi-worked piece;
    (b) a working station disposed within said frame, the semi-worked piece being arranged with the longitudinal axis along a working axis in said working station;
    (c) a clamp arranged at a plurality of cross sections of the semi-worked piece for locking the semi-worked piece in said working station;
    (d) a tool arranged for carrying out workings on faces of the semi-worked piece;
    (e) a support to which the semi-worked piece is fixed by said clamp, said support being rotatable about a service axis and comprising at least one support elements arranged for rotating the semi-worked piece about said working axis, each of said at least one support element being axially delimited by a couple of end flanges, interconnected to each other by a couple of uprights; and
    (f) a guide provided on said couple of uprights for slidably receiving said clamp.

12. The machine according to claim 11, wherein said at least one support element is arranged for rotating in said support, said support being arranged for rotating said at least one support element with the semi-worked piece associated thereto about said service axis.

13. The machine according to claim 12, further comprising a loading station wherein the semi-worked piece in a raw condition is introduced into said machine and an unloading station wherein the semi-worked piece following working is extracted from said machine, and wherein a plurality of said support elements are mounted on said support, said support being arranged for rotating said support elements about said service axis so as to bring successively each one of said support elements into said working station, into said unloading station and into said loading station.

14. A machine for carrying out mechanical workings comprising:
   (a) a frame arranged for receiving a semi-worked piece to be worked, the semi-worked piece having a length and a cross section smaller than the length measured along a longitudinal axis of the semi-worked piece;
   (b) a working station disposed within said frame, the semi-worked piece being arranged with the longitudinal axis along a working axis in said working station;
   (c) a clamp arranged at a plurality of cross sections of the semi-worked piece for locking the semi-worked piece in said working station;
   (d) a tool arranged for carrying out workings on faces of the semi-worked piece; and
   (e) a support to which the semi-worked piece is fixed by said clamp, said support being rotatable about a service axis and comprising at least one support element arranged for rotating the semi-worked piece about said working axis, each of said at least one support element having an upper plate and being axially delimited by a couple of end flanges, interconnected to each other by a couple of uprights, each flange of said couple of flanges being provided at said working axis with an appendix passing through said upper plate.

15. The machine according to claim 14 wherein said appendix is rotatably coupled to said upper plate though a roller interposed between said appendix and a sleeve fixed to said upper plate.

* * * * *

UNITED STATES PATENT AND TRADEMARK OFFICE
CERTIFICATE OF CORRECTION

PATENT NO.     : 6,823,572 B2
DATED          : November 30, 2004
INVENTOR(S)    : Bellucci It is certified that error appears in the above-identified patent and that said Letters Patent is hereby corrected as shown below:

Column 6,
Line 56, after the word "support" please change "elements" to correctly read:
-- element --.
Line 58, after the word "supprt" please change "element" to correctly read:
-- elements --.

Signed and Sealed this

Thirty-first Day of May, 2005

JON W. DUDAS
*Director of the United States Patent and Trademark Office*